(12) United States Patent
Zhang

(10) Patent No.: US 9,593,683 B2
(45) Date of Patent: Mar. 14, 2017

(54) POLLUTANTS COLLECTING PUMP FOR WATER SURFACE

(75) Inventor: Ling Zhang, Beijing (CN)

(73) Assignee: SINO-GAS & OIL TECHNOLOGY CO., LTD., Beijing (CN)

(*) Notice: Subject to any disclaimer, the term of this patent is extended or adjusted under 35 U.S.C. 154(b) by 594 days.

(21) Appl. No.: 13/817,177

(22) PCT Filed: Jun. 30, 2011

(86) PCT No.: PCT/CN2011/001083
§ 371 (c)(1),
(2), (4) Date: Mar. 15, 2013

(87) PCT Pub. No.: WO2012/022110
PCT Pub. Date: Feb. 23, 2012

(65) Prior Publication Data
US 2013/0189096 A1    Jul. 25, 2013

(30) Foreign Application Priority Data
Aug. 17, 2010    (CN) .......................... 2010 1 0254685

(51) Int. Cl.
*F04D 3/00*    (2006.01)
*E02B 15/10*    (2006.01)
(Continued)

(52) U.S. Cl.
CPC ................ *F04D 3/00* (2013.01); *E02B 15/10* (2013.01); *C02F 1/40* (2013.01); *C02F 2101/32* (2013.01);
(Continued)

(58) Field of Classification Search
CPC .................................. E02B 15/10; E02B 15/04
(Continued)

(56) References Cited

U.S. PATENT DOCUMENTS 3,491,880 A * 1/1970 Reck .............................. 209/164
3,635,342 A * 1/1972 Mourlon et al. .............. 210/787
(Continued)

FOREIGN PATENT DOCUMENTS

CN    1237541 A    12/1999
CN    2444988 Y    8/2001
(Continued)

OTHER PUBLICATIONS

Office Action (KIPO) CN 201010254685.4 dated Apr. 27, 2013.
(Continued)

*Primary Examiner* — Thai Ba Trieu
*Assistant Examiner* — Jessica Kebea
(74) *Attorney, Agent, or Firm* — Daniel J. Chalker; Edwin S. Flores; Chalker Flores, LLP

(57) ABSTRACT

A pollutant collecting pump for water surface comprises a power device (1) and a pollutant collecting barrel (6). The power device (1) is connected to the pollutant collecting barrel (6). A pollutant inlet (4) is provided on the upper portion of the pollutant collecting barrel (6), and a pollutant outlet (5) is provided on the lower portion of the pollutant collecting barrel (6). A blade (2) is provided outside the pollutant collecting barrel (6), and an axis of the pollutant collecting barrel (6) is perpendicular to a rotating surface of the blade (2). The pollutant inlet (4) is positioned above the blade (2). The pollutant collecting pump for water surface is adapted to collect pollutants distributed on water surface with low density and small thickness, and has the advantages in simple structure, low manufacturing cost, convenient operation and thorough collection.

4 Claims, 2 Drawing Sheets

(51) Int. Cl.
*C02F 1/40* (2006.01)
*C02F 101/32* (2006.01)
*C02F 103/00* (2006.01)

(52) U.S. Cl.
CPC .... *C02F 2103/007* (2013.01); *C02F 2303/24* (2013.01)

(58) Field of Classification Search
USPC .......................................................... 210/784
See application file for complete search history.

(56) References Cited

U.S. PATENT DOCUMENTS

| | | | | |
|---|---|---|---|---|
| 3,722,689 A | * | 3/1973 | Markel et al. | 210/242.3 |
| 3,753,496 A | * | 8/1973 | Boyd | 210/242.3 |
| 3,800,951 A | * | 4/1974 | Mourlon et al. | 210/242.3 |
| 4,024,063 A | * | 5/1977 | Mori | 210/242.1 |
| 4,111,809 A | * | 9/1978 | Pichon | 210/242.1 |
| 4,142,972 A | * | 3/1979 | Nebeker | E02B 15/107 210/242.3 |
| 4,265,758 A | * | 5/1981 | Fox | 210/242.3 |
| 4,303,520 A | * | 12/1981 | Wirt | 210/242.1 |
| 4,355,511 A | * | 10/1982 | Jones | 60/507 |
| 6,120,681 A | * | 9/2000 | Heo | 210/86 |

FOREIGN PATENT DOCUMENTS

| | | |
|---|---|---|
| CN | 1629077 A | 6/2005 |
| CN | 101555688 A | 10/2009 |
| CN | 201738292 | 9/2011 |
| DE | 2027479 A1 | 12/1971 |
| EP | 1205604 A1 | 5/2002 |
| FR | 2540904 A1 | 8/1984 |
| JP | S55 28725 E | 2/1980 |
| SU | 1120060 A1 | 10/1984 |

OTHER PUBLICATIONS

Office Action (KIPO) CN 201010254685.4 dated Aug. 13, 2013.
European Search Report, EP 11 81 7638 dated Dec. 12, 2013.
PCT Search Report PCT/CN2011/001083 dated Oct. 20, 2011.

* cited by examiner

POLLUTANTS COLLECTING PUMP FOR WATER SURFACE

CROSS-REFERENCE TO RELATED APPLICATIONS

This application is the National Stage of International Application No. CT/CN2011/001083, filed on 30 Jun. 2011 claiming the priority of CN 201010254685.4, filed on 17 Aug. 2010.

FIELD OF THE INVENTION

The present invention relates to a technical field of devices for collecting and cleaning up environmental pollutants, and in particular, to a pollutant collecting pump for water surface used for collecting and cleaning such pollutants on water surface.

BACKGROUND OF THE INVENTION

With the development and progress in human production, environmental pollution becomes more and more serious. Generally, surfaces of water body such as rivers, lakes, oceans and the like have been heavily contaminated by modernized large-scale industry, agriculture, extractive industry and transportation industry. Especially, oil spilling in large-scale often occurs during offshore oil drilling and transportation. Pollutants like oil floating on water surface over a long period bring horrible threats to the environment, wild fauna and flora and the human's health.

In most cases, apparatuses like scraper devices are used in prior art to collect pollutants like petroleum on water surface, and adapted to collect pollutants accumulated massively and thickly on water surface. However, it is difficult for the existing apparatuses to completely collect a small quantity or trace of pollutants on water surface, particularly when such pollutants are distributed on water surface over a large area with low density and small thickness, resulting in further contamination to the environment by remained pollutants.

Therefore, there is an urgent need for a new type of device which is adapted to collect more thoroughly pollutants distributed on water surfaces with low density and small thickness.

SUMMARY OF THE INVENTION

In order to achieve the object mentioned above, the present invention adopts a technical solution as follows:

A pollutant collecting pump for water surface, comprising a power device and a pollutant collecting barrel, wherein the power device is connected to the pollutant collecting barrel which is provided with a pollutant inlet on its upper portion, a pollutant outlet on its lower portion, and a blade on its outside, and wherein the pollutant collecting barrel has an axis perpendicular to a rotating surface of the blade, and the pollutant inlet is positioned adjacent to the blade.

The pollutant collecting pump for water surface further comprises a flow stabilizing column which is arranged coaxially to the axis of the pollutant collecting barrel, wherein the pollutant inlet is arranged adjacent to the flow stabilizing column.

Furthermore, the flow stabilizing column is in the form of cylinder or spiral structure.

In addition, a water jacket is located between the blade and the power device.

Furthermore, the pollutant outlet is located under the blade.

The pollutant collecting pump for water surface according to the present invention can be operatively applied to a polluted water surface by means of buoys or ships.

During operation, the axis of the pollutant collecting barrel is oriented perpendicularly to the polluted water surface with the pollutant inlet below the sea level. A vortex field is formed on water surface by means of the blade rotated by the power device, and thus the pollutants on water surface are accumulated towards the flow stabilizing column under the influence of the vortex field, so that a pollutant accumulation area will be formed around the flow stabilizing column, and thus the accumulated pollutants will be sucked into the pollutant inlet.

The flow stabilizing column is able to stabilize the pollutants accumulation core formed in the axial direction and functions to some extent to rotate to drive, such that the pollutants flow towards the pollutant outlet and finally are collected in a collecting device. A gearing is arranged between the flow stabilizing column and the pollutant collecting barrel, so that the pollutant collecting barrel and the flow stabilizing column can be rotated at a same speed or different speeds according to the viscosity of oil.

The pollutant collecting barrel is rotated with the power device, and thus a suction force is generated under the influence of centrifugal force at the pollutant inlet, such that the pollutants are sucked into the pollutant inlet.

As used herein, the expression "being arranged or connected coaxially" means that axes of two members arranged or connected to each other are arranged in a line.

The present invention has the following advantages:
In this invention, pollutants on water surface are sucked into the pollutant inlet by means of centrifugal force and then collected, resulting in simple structure, low manufacturing cost and convenient operation.
Shortcomings in prior art like incomplete collection of pollutants on water surface, etc. can be overcome by the pollutant collecting pump for water surface according to the present invention which is adapted to collect more thoroughly pollutants on water surface distributed with low density and small thickness.

DETAILED DESCRIPTION OF DEPICTED EMBODIMENTS

A preferred embodiment of the present invention will now be described below with reference to the accompanying drawing.

Figure 1:
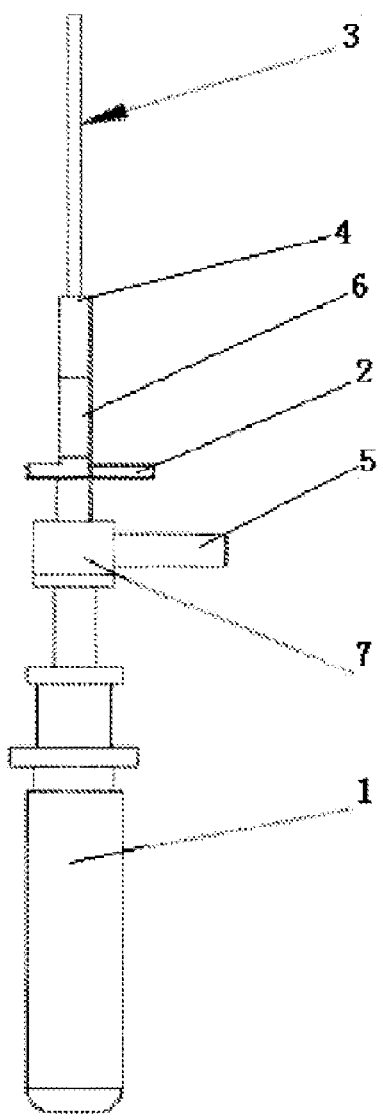
FIG. 1 and FIG. 2 are a schematic view showing the structure of a preferred embodiment according to the present invention, in which the flow stabilizing column in the form of a cylinder is illustrated in FIG. 1 while FIG. 2 schematically shows the flow stabilizing column having the spiral structure.
Figure 2:
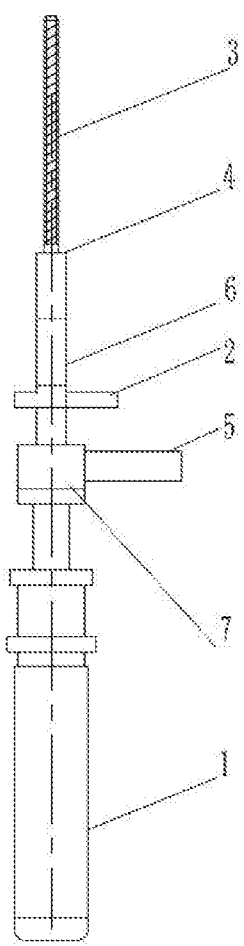

A pollutant collecting pump for water surface comprises a power device 1 and a pollutant collecting barrel 6, wherein the power device 1 is connected to the pollutant collecting barrel 6. A pollutant inlet 4 is provided on the upper portion of the pollutant collecting barrel 6, and a pollutant outlet 5 is provided on the lower portion of the pollutant collecting barrel 6. A blade 2 is provided at the outside of the pollutant collecting barrel 6, an axis of which barrel 6 is perpendicular to the rotating surface of the blade 2. The pollutant inlet 4 is positioned above the blade 2. The pollutant collecting pump for water surface further comprises a flow stabilizing column 3. The flow stabilizing column 3 and the pollutant collecting barrel 6 are arranged coaxially. The pollutant inlet 4 is arranged adjacent to flow stabilizing column 3. A sleeve 7 is located between the blade 2 and the power device 1. The pollutant outlet 5 is located under the blade 2. The flow stabilizing column 3 is configured to be in form of spiral structure, as illustrated in FIG. 2, and the flow stabilizing column 3 is able to stabilize a pollutant accumulation core formed in the axial direction and functions to some extent to rotate to drive, so that the pollutants will flow towards the pollutant outlet and ultimately be collected in a collecting device. Alternatively, the flow stabilizing column 3 may be in the form of cylinder, as illustrated in FIG. 1.

During operation, the axis of the pollutant collecting barrel 6 is oriented perpendicularly to a polluted water surface, with the pollutant inlet 4 located below the sea level. The power device 1 drives the blade 2 to rotate, so as to form a vortex field on water surface, under the influence of which the pollutants on water surface will be accumulated towards the flow stabilizing column 3, so that a pollutant accumulation core is formed around the flow stabilizing column 3, and thus the accumulated pollutants is sucked into the pollutant inlet 4. The pollutant collecting barrel 6 is rotated with the power device 1 and a suction force is formed at the pollutant inlet 4 under the influence of centrifugal force, so that pollutants are sucked into the pollutant inlet 4.

While the present application is described in detail with reference to concrete preferable embodiments, a skilled person in the art shall understand that this invention should not limited to the above disclosed embodiments, and any modifications and equivalents should be covered by the protection scope of this invention, without departing from the spirit and principle of the present invention.

The invention claimed is:

1. A pollutant collecting pump for water surface, comprising a power device and a pollutant collecting barrel wherein the power device is connected to the pollutant collecting barrel and the pollutant collecting barrel is provided with a pollutant inlet on an upper portion, a pollutant outlet on a lower portion, and a blade on an outside of the pollutant collecting barrel and wherein the pollutant collecting barrel has an axis perpendicular to a rotating surface of the blade, and the pollutant inlet is positioned above the blade, wherein the pollutant collecting pump for water surface further comprises a flow stabilizing column arranged along the axis of the pollutant collecting barrel and extending from the pollutant inlet and wherein the flow stabilizing column further comprises a spiral structure.

2. The pollutant collecting pump for water surface according to claim 1, wherein a water sleeve is located between the blade and the power device.

3. The pollutant collecting pump for water surface according to claim 1, wherein the pollutant outlet is located below the blade.

4. The pollutant collecting pump for water surface according to claim 1, wherein the flow stabilizing column is configured to be rotatable.

\* \* \* \* \*